United States Patent
Smirnov

(10) Patent No.: US 11,073,845 B2
(45) Date of Patent: Jul. 27, 2021

(54) PARASITIC FLOW CORRECTION METHOD AND APPARATUS

(71) Applicant: Hitachi Metals, Ltd., Tokyo (JP)

(72) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 150 days.

(21) Appl. No.: 16/550,742

(22) Filed: Aug. 26, 2019

(65) Prior Publication Data

US 2021/0064067 A1  Mar. 4, 2021

(51) Int. Cl.
G05D 7/06 (2006.01)
G01F 1/696 (2006.01)

(52) U.S. Cl.
CPC .......... *G05D 7/0623* (2013.01); *G01F 1/696* (2013.01); *G05D 7/0635* (2013.01)

(58) Field of Classification Search
CPC .... G05D 7/0623; G05D 7/0635; G01F 1/696; Y10T 137/7761
USPC ........................ 137/487.5; 700/282, 28–55
See application file for complete search history.

(56) References Cited

U.S. PATENT DOCUMENTS

| | | | | |
|---|---|---|---|---|
| 5,303,731 A * | 4/1994 | Vavra | .......................... | G01F 1/50 137/468 |
| 6,119,710 A * | 9/2000 | Brown | ...................... | G01F 1/50 137/14 |
| 7,640,078 B2 | 12/2009 | Smirnov | | |
| 7,919,955 B2 * | 4/2011 | Tang | .................... | H02M 3/1584 323/272 |
| 8,112,182 B2 | 2/2012 | Tokuhisa et al. | | |
| 9,008,821 B2 * | 4/2015 | Okita | .................. | G05B 13/0265 700/173 |
| 9,027,585 B2 | 5/2015 | Smirnov | | |
| 2002/0198668 A1 * | 12/2002 | Lull | .......................... | G05B 5/01 702/45 |
| 2004/0074311 A1 * | 4/2004 | Lull | ...................... | G01F 15/024 73/861 |
| 2005/0223813 A1 | 10/2005 | Lull et al. | | |
| 2009/0078324 A1 * | 3/2009 | Dinh | .................... | G05D 7/0635 137/487.5 |
| 2011/0054702 A1 | 3/2011 | Smirnov et al. | | |
| 2012/0186655 A1 | 7/2012 | Smirnov et al. | | |
| 2013/0146148 A1 | 6/2013 | Smirnov | | |

(Continued)

OTHER PUBLICATIONS

Japan Patent Office, "International Search Report and Written Opinion Regarding International Application No. PCT/JP2020/031710", dated Nov. 17, 2020, p. 8 Published in: JP.

*Primary Examiner* — William M McCalister
(74) *Attorney, Agent, or Firm* — Neugeboren O'Dowd PC

(57) ABSTRACT

Mass flow controllers and methods for correcting flow inconsistencies associated with parasitic flow of a fluid in mass flow controllers are disclosed. A method includes obtaining a pressure measurement signal of the fluid generated by a pressure sensor and receiving a flow sensor signal of the fluid generated by a flow sensor. An estimated parasitic flow signal is generated using the pressure measurement signal, and the flow sensor signal is accelerated to produce an accelerated flow sensor signal with a bandwidth that is comparable to that of the estimated parasitic flow signal. A corrected flow signal is generated using the accelerated flow sensor signal and the estimated parasitic flow signal to control the mass flow controller.

12 Claims, 7 Drawing Sheets

(56) References Cited

U.S. PATENT DOCUMENTS

| | | |
|---|---|---|
| 2014/0246097 A1 | 9/2014 | Smirnov |
| 2015/0212524 A1* | 7/2015 | Kehoe .................. G05D 7/0635 137/15.01 |
| 2021/0064067 A1* | 3/2021 | Smirnov .............. G05D 7/0623 |

* cited by examiner

PARASITIC FLOW CORRECTION METHOD AND APPARATUS

FIELD OF THE INVENTION

The present invention relates to mass flow measurement and control systems, and in particular, but not by way of limitation, the present invention relates to improving measurement and control of fluid flow.

BACKGROUND OF THE INVENTION

As shown in FIG. 5, a typical mass flow controller (MFC) 500 may include a bypass 110 through which a gas flows, and the bypass 110 directs a constant proportion of gas through a main path 115 and a sensor tube 120. As a consequence, by measuring the flowrate of the fluid (e.g., gas or liquid) through the sensor tube 120, a thermal flow sensor 123 can provide a flow sensor signal 150 that is indicative of the flowrate of the fluid flowing through the main path 115 of the MFC. It is known in the art that the flow sensor signal 150 is very slow (e.g., it may have a response time of between 2 and 3 seconds), so as shown in FIG. 6, the flow sensor signal 150 is accelerated with a low noise acceleration filter (Block 506) to produce a measured flow signal 507 that is more responsive to changes in flowrates than the flow sensor signal 150 while having a relatively low level of noise (e.g., in the range of 0.1% to 1%).

Referring to FIG. 7 simultaneously with FIGS. 5 and 6, it is also known that when an inlet pressure 501 of the fluid changes, a parasitic flow of fluid may run through the bypass 110 and the sensor tube 120 into a dead volume 117 (located between the bypass 110 and a control valve 140 of the MFC 400). Thus, the parasitic flow is measured by the thermal flow sensor 123 without the parasitic flow exiting the MFC 400. More specifically an actual-bypass flowrate 503 of the fluid that travels around the bypass 110 may be greater than a delivered flowrate 511 that exits the MFC 411. As a consequence, the parasitic flow should be subtracted from measured flow signal 507 to obtain a more accurate measure of the delivered flowrate 511.

As shown in FIG. 6, to correct the measured flow signal 507 in the prior art, a pressure measurement signal 155 is obtained (Block 502) from a pressure sensor 178, and an estimated parasitic flow signal 505 may be obtained (Block 504) (based upon a measured pressure of the fluid), and the estimated parasitic flow signal 505 may be used to correct the measured flow signal 507. But in order to achieve a valid correction, the bandwidth of the estimated parasitic flow signal 505 and the measured flow signal 507 must be substantially the same. The measured flow signal 507, however, typically has a time constant between 50 and 100 milliseconds while a bandwidth of the estimated parasitic flow signal 505 is relatively high (due to the extremely fast response time of the pressure signal that is used to calculate the estimated parasitic flow).

As a consequence, the prior art control algorithm 600 filters the estimated parasitic flow signal 505 with a low time constant (TC), low pass, filter (Block 509) to produce a low bandwidth parasitic flow signal 508 (with a bandwidth that is similar to the measured flow signal 507) that is subtracted from the measured flow signal 507 to produce a corrected flow signal 510 that is provided to a closed loop control algorithm 516.

The prior art approach to correcting the measured flow signal 507 works sufficiently well for high-flow MFCs, where parasitic flow is relatively low, and the thermal flow sensor 123 operates in a linear operating range. But there are known disadvantages to approach when using it with low flow MFCs.

For example, when fluid flow conditions change rapidly as a result of, for example, rapid pressure changes, the thermal flow sensor 123 may saturate so that the parasitic flowrate is above a full-scale range of the thermal mass flow sensor 123; thus, the readings of the thermal flow sensor 123 become very non-linear. As a consequence, the measured flow signal 507 is not even an accurate representation of the actual-bypass flowrate 503. More specifically, the actual-bypass flowrate 503 of the fluid that travels around the bypass 110 may reach levels 513 (shown in FIG. 7) that are substantially greater than are indicated by the measured flow signal 507. As a consequence, even if the estimated parasitic flow signal 505 and the low bandwidth parasitic flow signal 508 are accurate, the corrected flow signal 510 is invalid because the measured flow signal 507 is invalid. Thus, if a controller 470 uses the corrected flow signal 510 within the closed loop control algorithm 516, the controller 470 may not properly control a control valve 140 to deliver a flowrate of the fluid according to the flowrate setpoint 185.

To address the issue of fast-changing pressure, the known approach in FIG. 6 includes ignoring the corrected flow signal 510 if the low bandwidth parasitic flow signal 508 indicates the measured flow signal 507 is unreliable (Block 518) and using a feed forward control algorithm 520 instead. In the example depicted in FIG. 7, the feed forward control algorithm 520 is engaged at t1 when the low bandwidth parasitic flow signal 508 exceeds a threshold 512, and the feed forward control algorithm 520 remains engaged during the time $T_{ff1}$ until the low bandwidth parasitic flow signal 508 falls to the threshold 512 at a time t2.

Although the feed forward control algorithm 520 is useful when parasitic flow renders the measured flow signal 507 unreliable, after a pressure of the fluid stabilizes, the parasitic flow drops, and the measured flow signal 507 is once again valid, it is preferable to use the closed loop control algorithm 516. But due to the slow response time of the low bandwidth parasitic flow signal 508, the feed forward control algorithm 520 remains engaged long after a pressure of the fluid has stabilized (and long after the estimated parasitic flow signal 505 has dropped). In other words, the feed forward control algorithm 520 remains in use longer than is desired or necessary. For example, in low flow devices (below 100 sccm) the recovery time from fast pressure change could be 5 seconds, 10 seconds, or even longer.

Accordingly, a need exists for a method and/or apparatus to provide new and innovative features that address the shortfalls of present methodologies in responding to rapid changes in fluid flow conditions.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Aspects of the present invention can provide a method for correcting flow inconsistencies associated with parasitic flow of a fluid in a mass flow controller. The method includes receiving a pressure measurement signal of the fluid generated by a pressure sensor, receiving a flow sensor signal of the fluid generated by a flow sensor, and generating an estimated parasitic flow signal using the pressure measurement signal. The flow sensor signal is accelerated to produce an accelerated flow sensor signal with a bandwidth that is comparable to that of the estimated parasitic flow signal, and a corrected flow signal is generated using the accelerated flow sensor signal and the estimated parasitic flow signal to control the mass flow controller.

Another aspect may be characterized as a mass flow controller that includes a valve that is adjustable to control a flowrate of a fluid responsive to a control signal, a pressure sensor configured to provide a pressure measurement signal that indicates a pressure of the fluid, and a thermal mass flow sensor configured to provide a flow sensor signal. The mass flow controller also includes a controller configured to accelerate the flow sensor signal to produce an accelerated flow sensor signal that has a bandwidth that is comparable to that of the pressure measurement signal. The controller is also configured to generate an estimated parasitic flow signal using the pressure measurement signal and the controller is configured to generate a corrected flow signal using the accelerated flow sensor signal and the estimated parasitic flow signal to control the mass flow controller.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

An aspect of the present invention is directed to mass flow controllers with improved parasitic flow correction and improved operation when changing from closed loop control to feed forward control.

For example, embodiments discussed herein are configured to more quickly change from closed loop control to feed forward control when one or more disturbances, such as a sudden pressure change, cause unreliable feedback measurements (e.g., due to parasitic flow) that are used in closed loop control. Moreover, the embodiments disclosed herein enable a faster return from feed forward control back to closed loop control.

Figure 1:
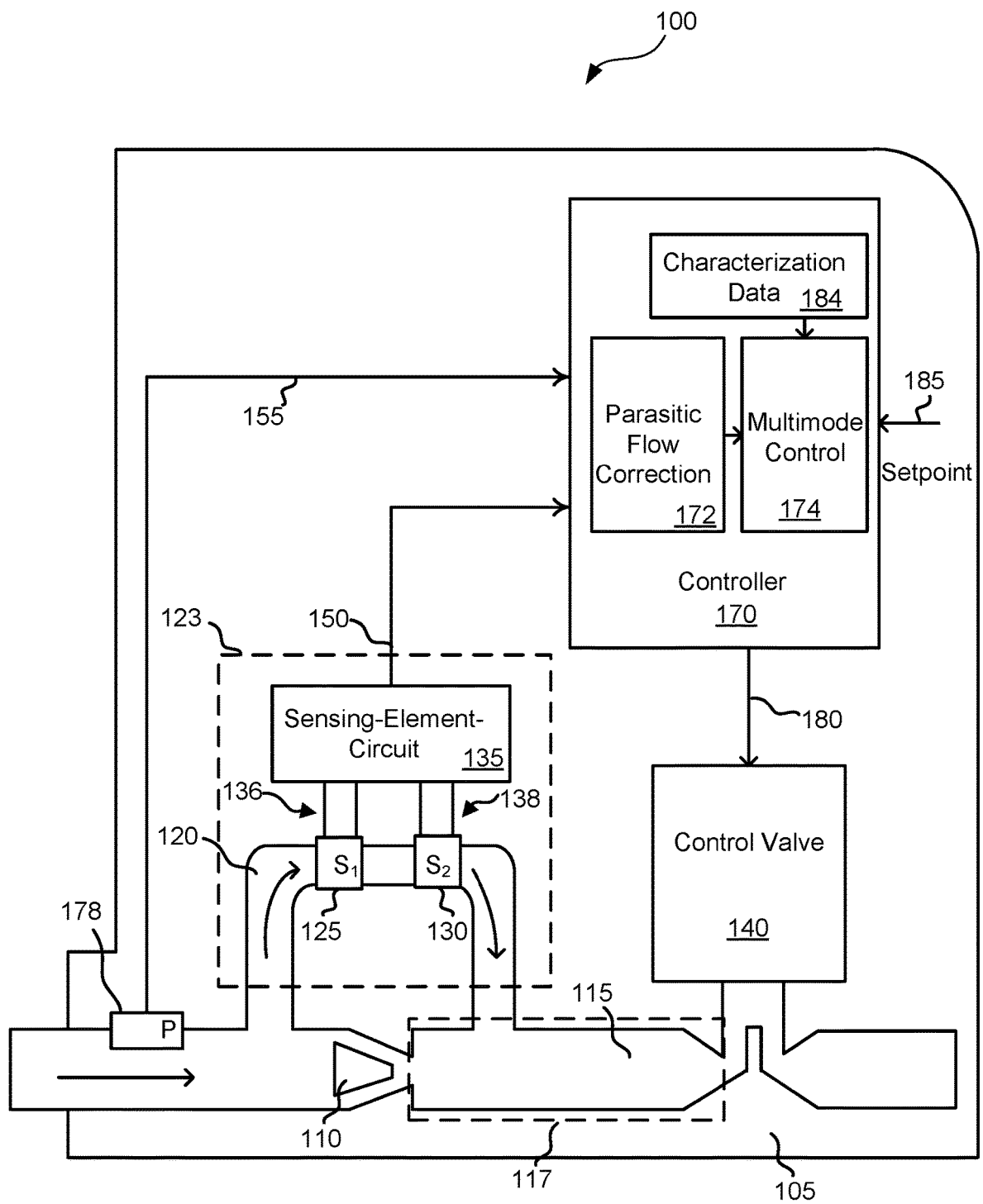
FIG. 1 is a block diagram that illustrates an exemplary mass flow controller that utilizes parasitic flow correction and a multimode control approach to control a flow of a fluid according to an embodiment of the invention.

Referring to FIG. 1, shown is an exemplary mass flow controller (MFC) 100 that implements parasitic flow correction and a multimode control methodology to control a flow of a fluid (e.g., from a fluid dispenser to a reaction vessel). The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1 may be implemented in hardware, firmware, software, or any combination thereof. Moreover, in light of this specification, the construction of each individual component is well known within the skill of those of ordinary skill in the art.

In some embodiments, the fluid controlled by the MFC 100 is a liquid (e.g., sulfuric acid) and in other embodiments a gas (e.g., nitrogen), but a person skilled in the art will appreciate, having the benefit of this disclosure, that the fluid being delivered by the MFC 100 may be any kind of fluid including, for example, a mixture of elements and/or compounds in any phase, such as a gas or a liquid. Depending upon the application, the MFC 100 may deliver a fluid in a gaseous state (e.g., nitrogen) and/or a liquid state (e.g., hydrochloric acid) to, for example, a tool in a semiconductor facility. The MFC 100 in many embodiments is configured to deliver a fluid under high pressure, low temperature, or to different types of containers or vessels.

As depicted, the mass flow controller 100 may include many of the same components as the prior art MFC 400 including the base 105, the bypass 110, the main path 115, and the sensor tube 120. As a consequence, the flowrate of the fluid (e.g., gas or liquid) through the sensor tube 120 is indicative of the flowrate of the fluid flowing through the main path of the MFC 100.

The sensor tube 120 may be a small bore tube that is part of a thermal flow sensor 123 of the MFC 100. And as shown, sensing elements 125 and 130 are coupled to (e.g., wound around) the outside of sensor tube 120. In one illustrative embodiment, sensing elements 125 and 130 are resistance-thermometer elements (e.g., coils of conductive wire), but other types of sensors (e.g., resistance temperature detectors (RTD and thermocouples) may also be utilized. Moreover, other embodiments may certainly utilize different numbers of sensors and different architectures for processing the signals from the sensors without departing from the scope of the present invention.

As depicted, sensing elements 125 and 130 are electrically connected to a sensing-element circuit 135. In general, the sensing-element circuit 135 is configured (responsive to signals 136, 138 from the sensing elements 125, 130) to provide the flow sensor signal 150, which is indicative of the flowrate through the sensor tube 120, and hence, indicative of the flowrate through the main path 115 of the MFC 100.

Although not shown in FIG. 1 for clarity, the flow sensor signal 150 may be processed to amplify and convert, using an analog to digital converter, the flow sensor signal 150 to produce a digital representation of the flow sensor signal 150. As one of ordinary skill in the art will readily recognize, the flow sensor signal 150 may also be adjusted (e.g., by adjusting the flow sensor signal 150 with predetermined calibration coefficients) based upon physical characteristics of the MFC 100 and/or characteristics of the fluid (e.g., gas) flowing through the MFC 100.

As shown in FIG. 1, the exemplary MFC 100 also includes a pressure sensor 178 that provides a pressure measurement signal 155 to the controller 170. Although not shown for clarity, the pressure measurement signal 155 may be amplified and converted, using an analog to digital converter, to a digital domain. The pressure sensor 178 may be realized, for example, by a gage pressure sensor, differential sensor, absolute pressure sensor or piezoresistive pressure sensor.

The controller 170 in this embodiment is part of a control system that includes sensing elements 125 and 130, sensing-element circuit 135, and the pressure sensor 178. The controller 170 is generally configured to generate a control signal 180 to control a position of the control valve 140 in order to provide a flowrate based upon the flowrate setpoint 185. The control valve 140 may be realized by a piezoelectric valve or solenoid valve, and the control signal 180 may be a voltage (in the case of a piezoelectric valve) or current (in the case of a solenoid valve).

And as shown, the controller 170 in this embodiment includes a parasitic flow correction module 172 and a multimode control component 174. As one of ordinary skill in the art, in view of this disclosure will appreciate, the controller 170 may be realized by a variety of components including software (e.g., stored in non-volatile memory), hardware and/or firmware or combinations thereof, and the components may store and execute non-transitory processor readable instructions that effectuate the methods described further herein.

Figure 2:
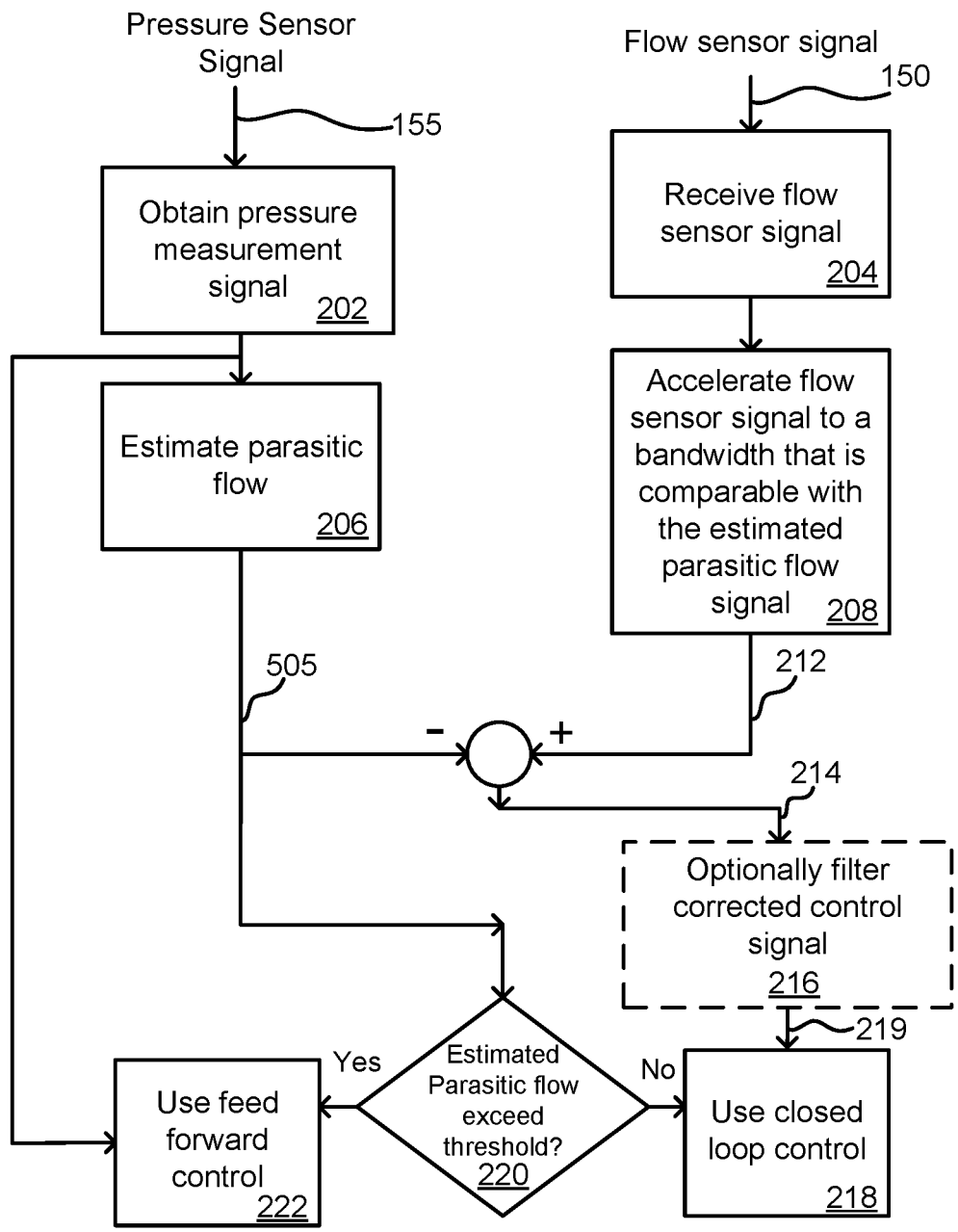
FIG. 2 is a flowchart depicting a method that may be traversed in connection with embodiments disclosed herein.

While referring to FIG. 1, simultaneous reference is made to FIG. 2, which is a flowchart depicting a method that may be traversed by the embodiment depicted in FIG. 1. As shown in FIG. 2, on an ongoing basis during operation of the MFC 100, the parasitic flow correction module 172 obtains the pressure measurement signal 155 (Block 202), and also receives the flow sensor signal 150 (Block 204).

Figure 5:
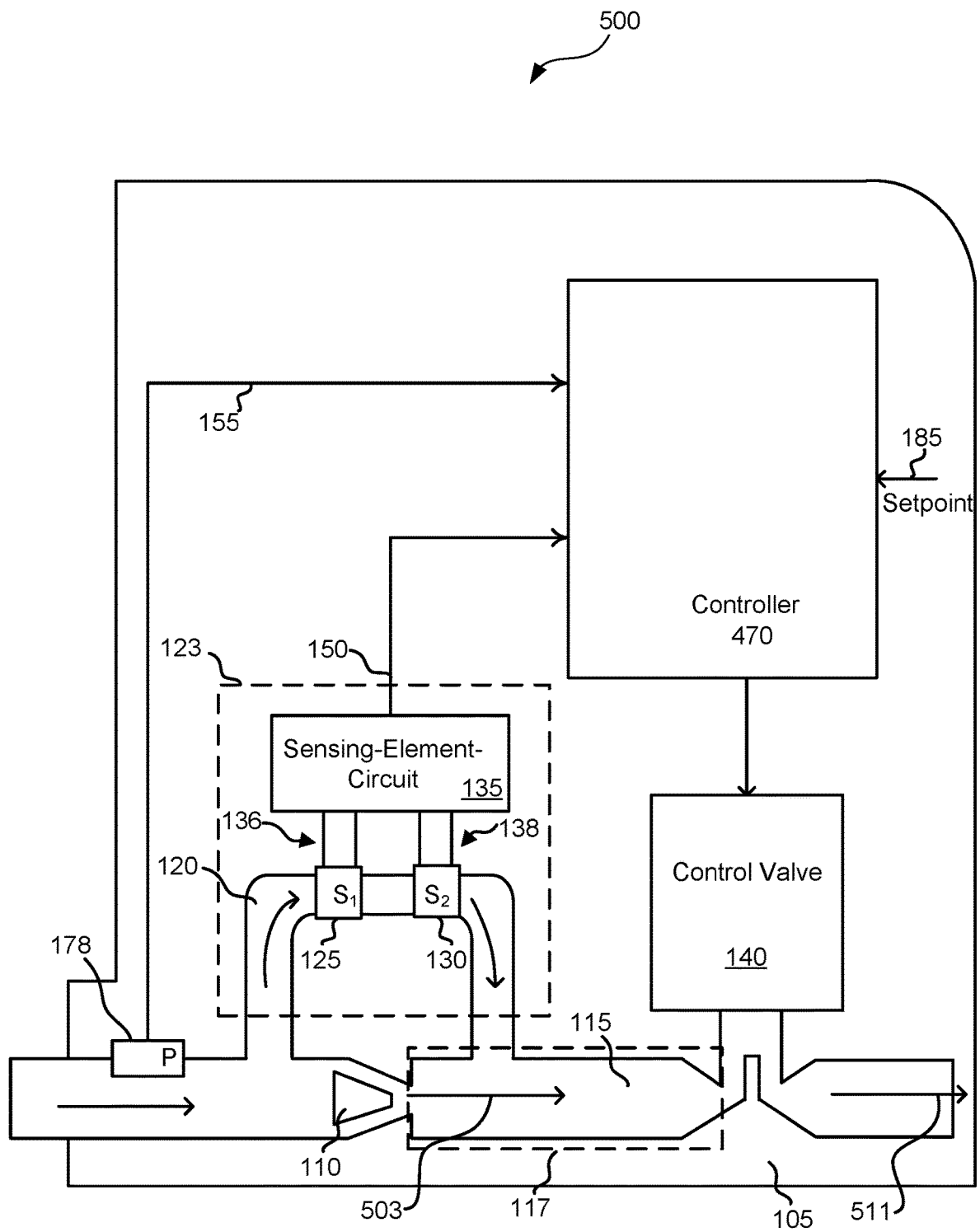
FIG. 5 is a block diagram depicting a prior art mass flow controller.
Figure 6:
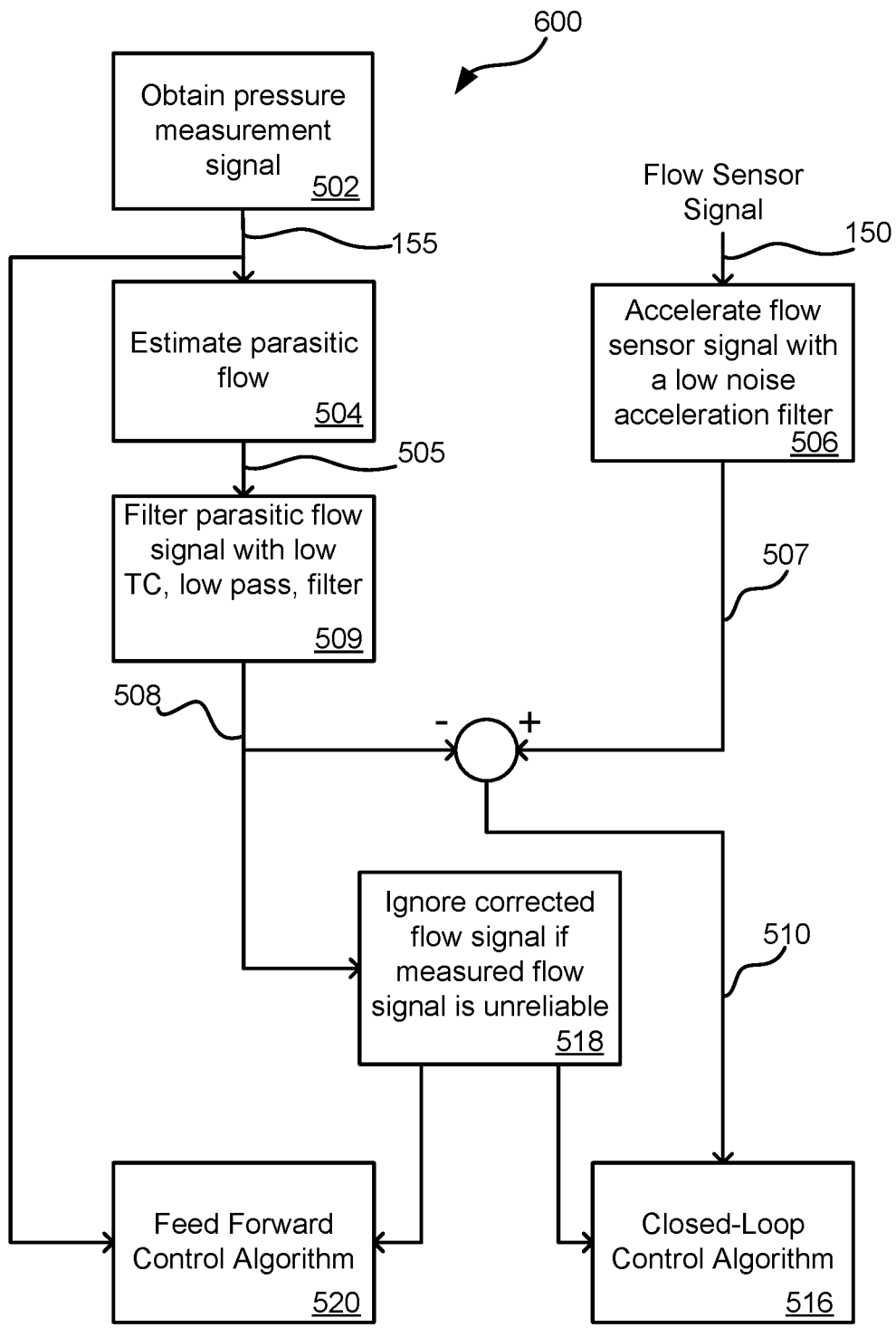
FIG. 6 is a flowchart depicting a prior art method implemented by the mass flow controller depicted in FIG. 5.
Figure 7:
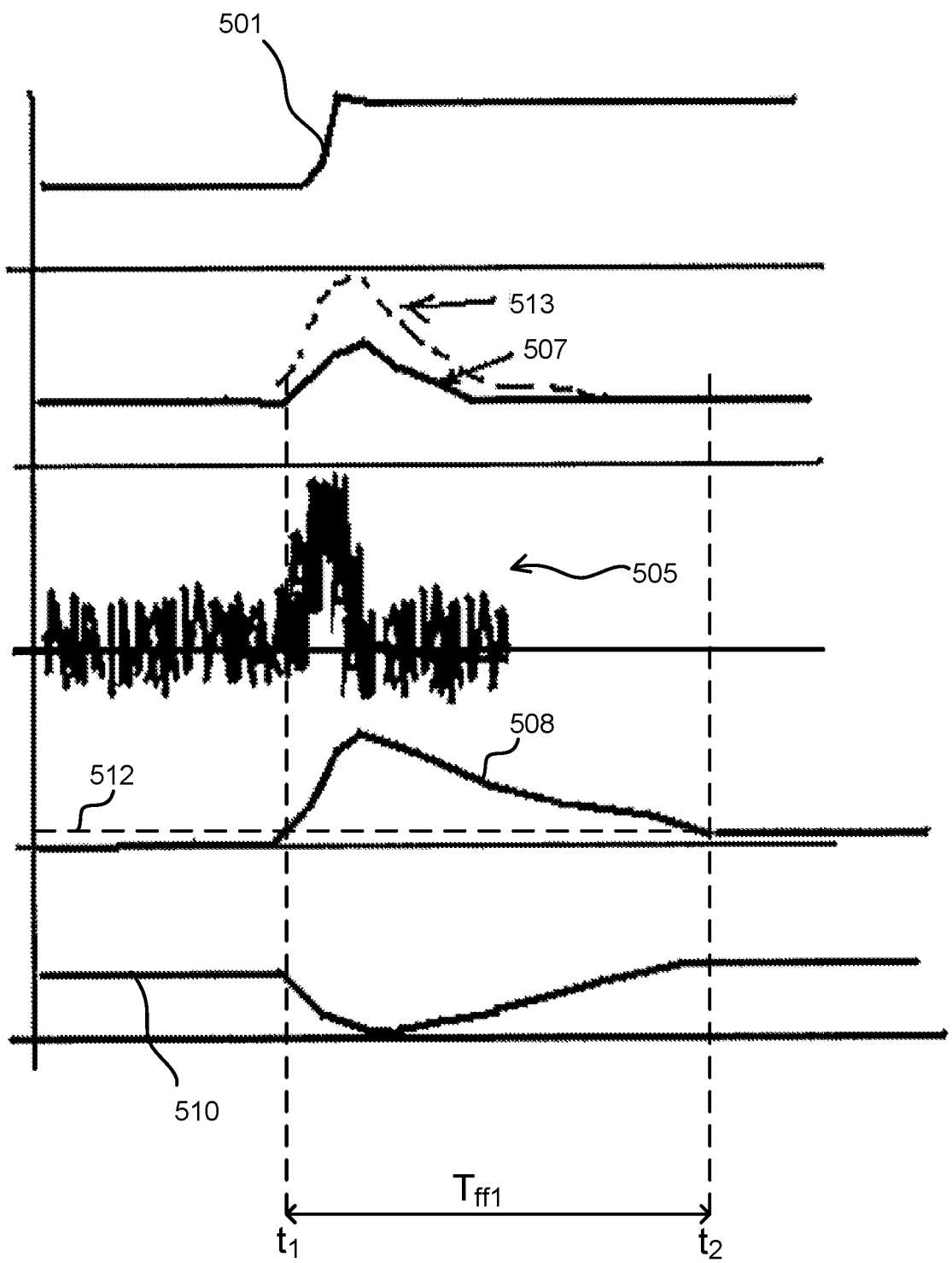
FIG. 7 includes graphs depicting operational aspects of the prior art mass flow controller depicted in FIG. 5.

The parasitic flow correction module 172 generally operates to correct the flow sensor signal 150, but in addition, the parasitic flow correction module 172 enables much faster operation of the multimode control component 174. As shown, the parasitic flow correction module 172 generates an estimated parasitic flow signal 505 that conveys an estimate of the parasitic flow (Block 206) and operates to provide parasitic flow compensation, but instead of "slowing down" the estimated parasitic flow signal 505 in the way the prior art does (as described above with reference to FIGS. 5 and 6), the received flow sensor signal 150 (at Block 204) is accelerated to produce an accelerated flow sensor signal 212 (also referred to herein as a "fast flow" signal 212) that has a bandwidth that is comparable to that of the estimated parasitic flow signal 505 (Block 208).

As used herein, the term "comparable" is intended to mean that the estimated parasitic flow signal 505 and the accelerated flow sensor signal 212 have a similar bandwidth. In some implementations, a bandwidth of the pressure sensor 178 is much wider than sampling rate of the controller 170, so the flow sensor signal 150 is accelerated as much as reasonably possible. For example, the parasitic flow correction module 172 may include an acceleration filter with a time constant of between 1 millisecond and 5 milliseconds to produce the accelerated flow sensor signal 212 that has a bandwidth that is comparable with the bandwidth of the estimated parasitic flow signal 505.

In this way, a corrected flow signal 214 is generated using the accelerated flow sensor signal 212 and the estimated parasitic flow signal 505 to control the mass flow controller 100. More specifically, as shown in FIG. 2, the estimated parasitic flow signal 505 is subtracted from the accelerated flow sensor signal to produce the corrected flow signal 214. As shown, the corrected flow signal 214 is used in closed loop control by the controller 170 of the MFC 100 (Block 218), and may optionally be filtered (Block 216) to produce a filtered presentation 219 of the corrected flow signal 214 that is used in the closed loop control at Block 218. More specifically, the controller 107 may implement closed loop control at Block 218 by adjusting the control signal 180, and hence the control valve 140, so that a flowrate represented by the corrected flow signal 214 is the same as the flowrate represented by flowrate setpoint 185.

The acceleration of the flow sensor signal 150 (at Block 208) may be up to its maximum bandwidth so it is comparable with a wide bandwidth of the estimated parasitic flow signal 505. For example, the acceleration of the flow sensor signal 212 (at Block 208) may be carried out by a filter with a time constant from 1 to 5 milliseconds. Accelerating the flow sensor signal 150 is counterintuitive and has not been suggested in the past because it produces substantially more noise. But utilizing the estimated parasitic flow signal 505 instead of the low bandwidth parasitic flow signal 508 (used in the prior art) enables a much faster determination as to whether the parasitic flow has exceeded a threshold or not (Block 220). Thus, the multimode control component 174 is able to more quickly engage and disengage from use of feed forward control (Block 222) as compared to the prior art.

Figure 3:
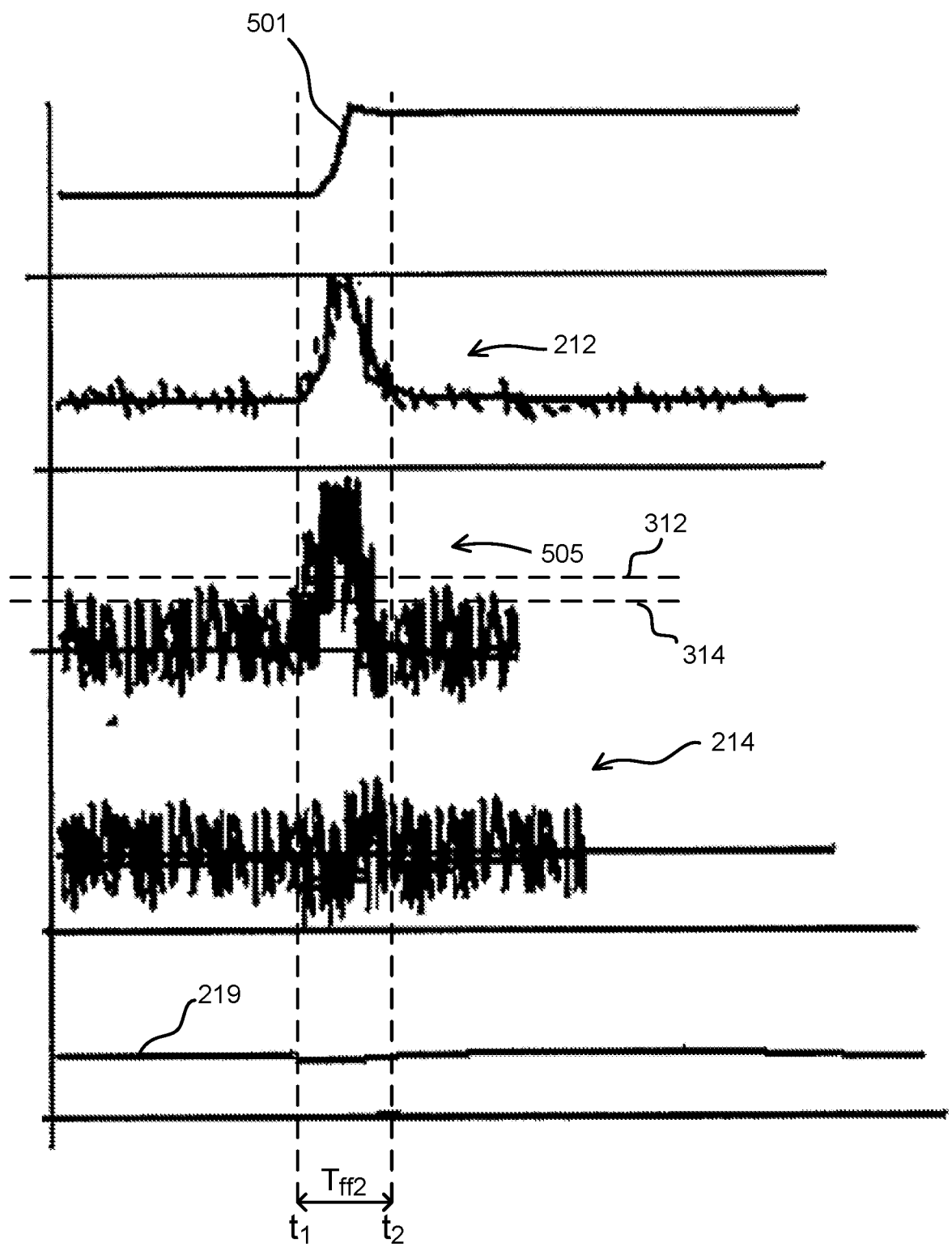
FIG. 3 includes graphs depicting exemplary operational aspects of the mass flow controller depicted in FIG. 1.

In some embodiments, closed loop control is reengaged when the parasitic flow falls below a different parasitic flow threshold than is used to engage feed forward control. Referring to FIG. 3 for example, there may be a first threshold 312 that triggers use of feed forward control at Block 222, and a second threshold 314 that triggers use of closed loop control at Block 218. But the threshold at Block 220 that triggers use of feed forward control at Block 222 may also be the same as the threshold that prompts the use of closed loop control at Block 218. It is also contemplated that a timer may be used in addition to the threshold at Block 220, for example, to prevent the closed loop control at Block 218 from being engaged too quickly after the feed forward control is engaged at Block 222. In this way, it is less likely that there will be switching back and forth between feed forward control at Block 222 and the closed loop control at Block 218 in instances where the parasitic flow is noisy and close to the threshold at Block 220.

The threshold(s) at Block 220 can be set manually to a specific value depending on expected parasitic flow noise. For example, without limitation, the threshold maybe 1%, 5%, or 10% of a full-scale flow rate of the MFC 100. The threshold that triggers the use of feed forward control at Block 220 can also be automatically derived from noise of the estimated parasitic flow signal 505 so that the threshold is set to be exceeded when a peak value of noise is exceeded by a certain order, for example, 2 or 3 times higher than noise of the estimated parasitic flow signal 505.

As shown in FIG. 3, the estimated parasitic flow signal 505 responds much faster to changes in pressure than the low bandwidth parasitic flow signal 508, and as a consequence, in response to the same change in inlet pressure 501, the multimode control component 174 uses feed forward control 222 for a time $T_{ff2}$, which is much shorter than the time $T_{ff1}$ that the prior art engages the feed forward control algorithm 520.

In addition, valid "fast" flow readings will be obtained much earlier after the parasitic flow has dropped back down because there is not the delay of the low noise acceleration filtering at Block 506 (of the prior art), so there will no longer be the lengthy recovery time from the sharp pressure change. Thus, the resulting accelerated flow sensor signal 212 is more accurate than the prior art's "slow" low bandwidth measured flow signal 507, and the corrected flow signal 214 is more accurate than the corrected flow signal 510 of the prior art. Moreover, if needed or desired, the "fast" corrected flow signal 214 may optionally be filtered (Block 216) with a desired time constant to provide the filtered presentation 219 of the corrected flow signal 214. Although the corrected flow signal 214 is improved over the prior art, a rapid change in pressure (as indicated by an increase in the estimated parasitic flow signal 505), may render the corrected flow signal 214 unreliable.

As a consequence, when the parasitic flow (as indicated by the estimated parasitic flow signal 505) exceeds the threshold (at Block 220), the multimode control component 172 prompts a switch from closed loop control at Block 218 to using feed forward control at Block 222. As one of ordinary skill in the art will appreciate, closed loop control may utilize proportional-integral-derivative (PID) control methodologies in connection with a feedback loop including the corrected flow signal 214.

When the multimode control component 174 uses feed forward control at Block 222, characterization data 184, which may reside in nonvolatile memory, is utilized by the multimode control component 174 to control a position of the control valve 140 to provide a fluid flowrate that is sufficiently close, or equal, to the flowrate corresponding to the flowrate setpoint 185. In many embodiments the characterization process to generate characterization data 184 is performed as part of a manufacturing process (e.g., carried out by a manufacturer or supplier of the MFC 100) before the mass flow controller 100 is utilized in a processing environment.

The characterization data 184 may include, for each of a plurality of pressures, a collection of data pairs that include a flow value (e.g., in terms of a percentage of a maximum flow) and valve position value (e.g., in terms of a percentage of a maximum valve position).

U.S. Pat. No. 7,640,078 entitled Multimode Control Algorithm, and U.S. Pat. No. 9,027,585 entitled Adaptive Pressure Insensitive Mass Flow Controller and Method for Multi-Gas Applications, which are incorporated herein in entirety by reference, disclose additional details relative to feedforward control that may be employed by the multimode control component 174.

Figure 4:
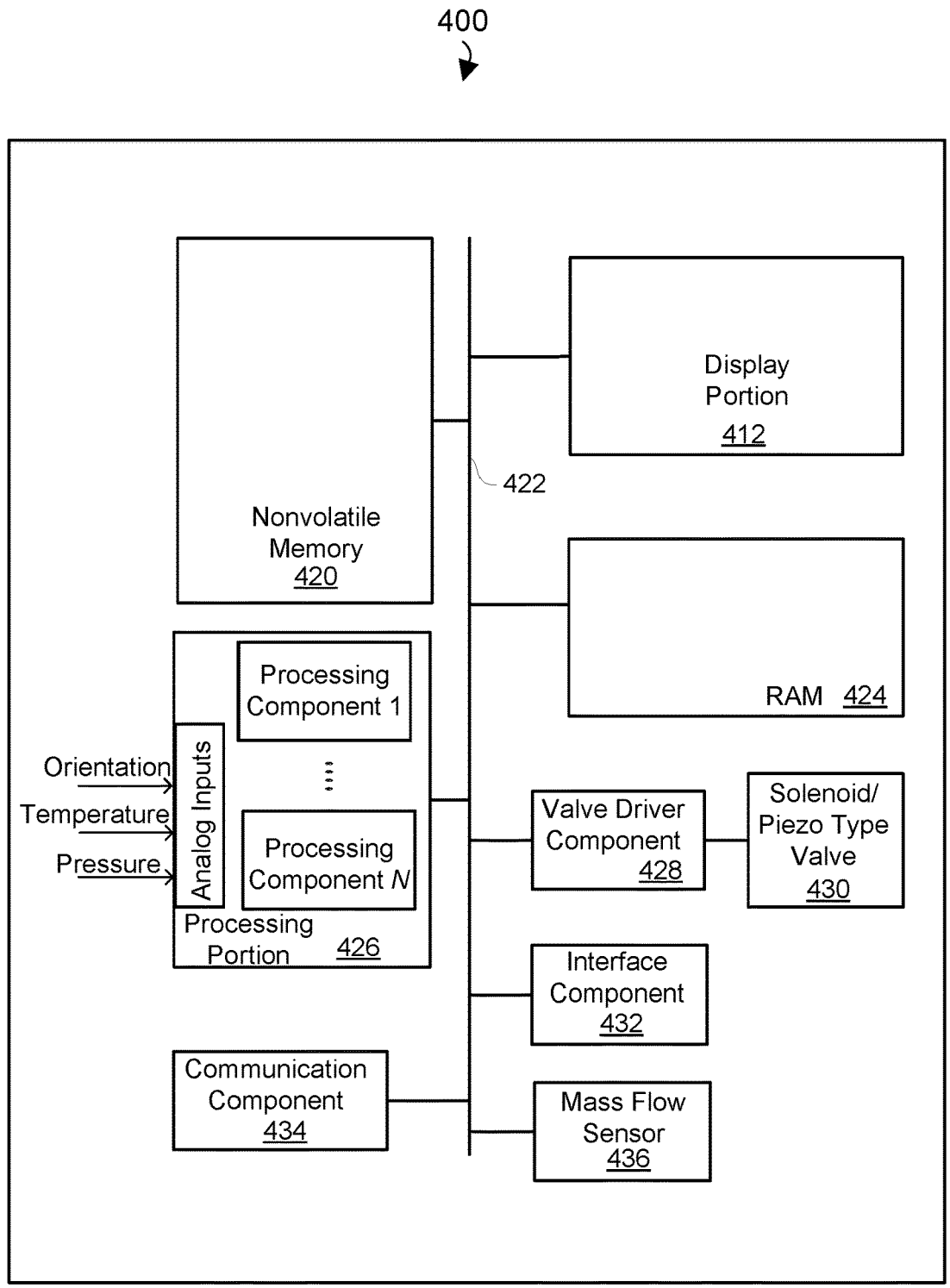
FIG. 4 is a block diagram depicting components that may be used to realize aspects of the mass flow controller in FIG. 1.

Referring next to FIG. 4, shown is a block diagram 400 depicting physical components that may be utilized to realize aspects of the MFC 100 described with reference to FIG. 1. As shown, a display portion 412, and nonvolatile memory 420 are coupled to a bus 422 that is also coupled to random access memory ("RAM") 424, a processing portion (which includes N processing components) 426, a valve driver component 428 that is in communication with a solenoid or piezo type valve 430, an interface component 432, a communication component 434, and a mass flow sensor 436. Although the components depicted in FIG. 4 represent physical components, FIG. 4 is not intended to be a hardware diagram; thus, many of the components depicted in FIG. 4 may be realized by common constructs or distributed among additional physical components. Moreover, it is certainly contemplated that other existing and yet-to-be developed physical components and architectures may be utilized to implement the functional components described with reference to FIG. 4.

The display portion 412 generally operates to provide a presentation of content to a user, and in several implementations, the display portion 412 is realized by an LCD or OLED display. For example, the display portion 412 may display a graphical or numeric representation of the flowrate setpoint 185 and one or more of the signals depicted in FIG. 4. In general, the nonvolatile memory 420 functions to store (e.g., persistently store) data and executable code including code that is associated with the functional components depicted in FIG. 1. In some embodiments for example, the nonvolatile memory 420 includes bootloader code, software, operating system code, file system code, and code to facilitate the implementation of one or more portions of the components discussed in connection with FIG. 1 including the parasitic flow correction module 172 and the multimode control component 174. In alternative implementations dedicated hardware may be utilized to implement one or more components depicted in FIG. 1.

In many implementations, the nonvolatile memory 420 is realized by flash memory (e.g., NAND or ONENAND memory), but it is certainly contemplated that other memory types may be utilized. Although it may be possible to execute the code from the nonvolatile memory 420, the executable code in the nonvolatile memory 420 is typically loaded into RAM 424 and executed by one or more of the N processing components in the processing portion 426. As shown, the processing portion 426 may receive analog orientation, temperature, and pressure (e.g., pressure signal 155) inputs that are utilized by the functions carried out by the controller 170.

The N processing components in connection with RAM 424 generally operate to execute the instructions stored in nonvolatile memory 420 to effectuate the functional components depicted in FIG. 1.

The interface component 432 generally represents one or more components that enable a user to interact with the MFC 100. The interface component 432, for example, may include a keypad, touch screen, and one or more analog or digital controls, and the interface component 432 may be used to translate an input from a user into the flowrate setpoint 185. And the communication component 434 generally enables the MFC 100 to communicate with external networks and devices including external processing tools. For example, an indicated flow may be communicated to external devices via the communication component 434. One of ordinary skill in the art will appreciate that the communication component 434 may include components (e.g., that are integrated or distributed) to enable a variety of wireless (e.g., WiFi) and wired (e.g., Ethernet) communications.

The mass flow sensor 436 depicted in FIG. 4 depicts a collection of components known to those of ordinary skill in the art to realize the thermal mass flow sensor 123 shown in FIG. 1. These components may include sensing elements, amplifiers, analog-to-digital conversion components, and filters.

Those of skill in the art will appreciate that the information and signals discussed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. In addition, the various illustrative logical blocks, modules, circuits, and algorithm steps described in connection with the embodiments disclosed herein may be implemented by other alternative components than those depicted in FIG. 4.

In conclusion, the present invention provides a system and method for controlling a flow of a fluid using a multimode control algorithm. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for correcting for parasitic flow of a fluid in a mass flow controller, the method comprising:
   obtaining a pressure measurement signal generated by a pressure sensor;
   receiving a flow sensor signal generated by a flow sensor;
   generating an estimated parasitic flow signal using the pressure measurement signal;
   accelerating the flow sensor signal to produce an accelerated flow sensor signal with a bandwidth that is comparable to that of the estimated parasitic flow signal without slowing down the estimated parasitic flow signal; and
   generating a corrected flow signal using the accelerated flow sensor signal and the estimated parasitic flow signal to control the mass flow controller.

2. The method of claim 1, including:
   determining with the estimated parasitic flow signal when to disengage a closed loop control of the mass flow controller;
   controlling the mass flow controller based on the pressure measurement signal when the closed loop control has been disengaged; and
   re-engaging the closed loop control when the corrected flow signal is reliable.

3. The method of claim 2, wherein the closed loop control is disengaged when the estimated parasitic flow signal exceeds a threshold.

4. The method of claim 3, wherein the closed loop control is reengaged when the estimated parasitic flow signal falls below the threshold.

5. A mass flow controller comprising:
   a valve configured to adjustably control a flowrate of a fluid responsive to a control signal;
   a pressure sensor configured to provide a pressure measurement signal that indicates a pressure of the fluid;
   a thermal mass flow sensor configured to provide a flow sensor signal; and
   a controller configured to:
   generate an estimated parasitic flow signal using the pressure measurement signal;
   accelerate the flow sensor signal to produce an accelerated flow sensor signal that has a bandwidth that is comparable to that of the estimated parasitic flow signal without slowing down the estimated parasitic flow signal;
   generate a corrected flow signal using the accelerated flow sensor signal and the estimated parasitic flow signal to control the mass flow controller.

6. The mass flow controller of claim 5, wherein the controller includes a multimode control component configured to:
   determine, with the pressure measurement signal, when to disengage a closed loop control;
   control the valve based on the pressure measurement signal when the closed loop control has been disengaged; and
   re-engage the closed loop control when the corrected flow signal is reliable.

7. The mass flow controller of claim 6, wherein the multimode control component is configured to determine when to disengage the closed loop control based upon the estimated parasitic flow signal exceeding a threshold.

8. The mass flow controller of claim 7, wherein the multimode control component is configured to re-engage the closed loop control based upon the estimated parasitic flow signal falling below the threshold.

9. The mass flow controller of claim 8, wherein the multimode control component is configured to re-engage the closed loop control based upon the estimated parasitic flow signal falling below another threshold.

10. The mass flow controller of claim 7, wherein the multimode control component is configured to enable the threshold to be manually set.

11. The mass flow controller of claim 7, wherein the multimode control component is configured to automatically set the threshold based upon a level of measured parasitic flow noise.

12. The mass flow controller of claim 5, wherein the controller includes an acceleration filter with a time constant of between 1 millisecond and 5 milliseconds to accelerate the flow sensor signal to produce the accelerated flow sensor signal.

* * * * *